United States Patent
Zhang et al.

(10) Patent No.: US 11,960,779 B1
(45) Date of Patent: Apr. 16, 2024

(54) DOCUMENT PRINTING IN A VIRTUALIZED COMPUTING ENVIRONMENT

(71) Applicant: VMware, Inc., Palo Alto, CA (US)

(72) Inventors: Hui Zhang, Beijing (CN); Tong Zhao, Beijing (CN); Kun Shi, Beijing (CN); Yue Zhao, Beijing (CN); Hui Yuan, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 18/218,116

(22) Filed: Jul. 5, 2023

(30) Foreign Application Priority Data

Jun. 8, 2023 (WO) ................ PCT/CN2023/099043

(51) Int. Cl.
*G06F 3/12* (2006.01)

(52) U.S. Cl.
CPC .......... *G06F 3/1211* (2013.01); *G06F 3/1206* (2013.01); *G06F 3/1227* (2013.01); *G06F 3/1285* (2013.01)

(58) Field of Classification Search
CPC .... G06F 3/1211; G06F 3/1206; G06F 3/1227; G06F 3/1285

USPC ....................................................... 358/1.15
See application file for complete search history.

(56) References Cited

U.S. PATENT DOCUMENTS

| | | | |
|---|---|---|---|
| 10,795,616 B1* | 10/2020 | Zhang | G06F 3/1289 |
| 2009/0190157 A1* | 7/2009 | Ferlitsch | G06F 3/1237 |
| | | | 358/1.15 |
| 2009/0237728 A1* | 9/2009 | Yamamoto | H04N 1/00204 |
| | | | 358/1.15 |
| 2013/0222827 A1* | 8/2013 | Watanabe | G06F 3/122 |
| | | | 358/1.14 |
| 2016/0328187 A1* | 11/2016 | Nathani | H04W 64/003 |

* cited by examiner

*Primary Examiner* — Allen H Nguyen
(74) *Attorney, Agent, or Firm* — King Intellectual Asset Management

(57) ABSTRACT

The capability to print to a portable document format (PDF) file is provided in a virtualized computing environment that supports a virtual desktop infrastructure (VDI). Printing-related properties, of local printers coupled to a client device, are provided to a host, so that virtual printers at the host can be configured with the printing-related properties. A simulator may be provided at the host to receive the printing-related properties from the client device and to receive a query from a virtualized computing instance for the printing-related properties, instead of the query being directly sent to the client device.

21 Claims, 6 Drawing Sheets

DOCUMENT PRINTING IN A VIRTUALIZED COMPUTING ENVIRONMENT

CROSS-REFERENCE TO RELATED APPLICATION

The present application claims the benefit of Patent Cooperation Treaty (PCT) Application No. PCT/CN2023/099043, filed Jun. 8, 2023. The PCT application is incorporated herein by reference in its entirety.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources in a virtualized computing environment may include central processing unit (CPU) resources, memory resources, storage resources, network resources, etc.

One example use of a virtualized computing environment is for a virtual desktop infrastructure (VDI) implementation, which is a type of desktop virtualization that allows a desktop to run on a VM that is provided by a hypervisor on a host server, that is typically located in a data center. A user uses the operating system (OS) and applications (which reside and execute at the VM on the host server) via an endpoint device of the user that communicates with the host server, just as if the OS/applications were actually running locally on the endpoint device.

VDI implementations provide the user with printing capability, so that the user can issue print jobs from the virtual desktop at the VM to a virtual printer, and then the printing is performed at a local printer (e.g., a physical printer) that is connected to the user's endpoint device (client device). However, printing in a virtualized computing environment (such as one that is implementing VDI) is prone to problems due to unavailability, incompatibility, and/or other limitations related to printers and/or print drivers. For example, there are some challenges with respect to printing to a portable document format (e.g., print to PDF) or to some other document type or document format, in a virtualized computing environment. Such problems may result in failed print jobs, poorer quality printer output, printing inefficiencies, and/or other adverse printing-related issues.

DETAILED DESCRIPTION

Figure 1:
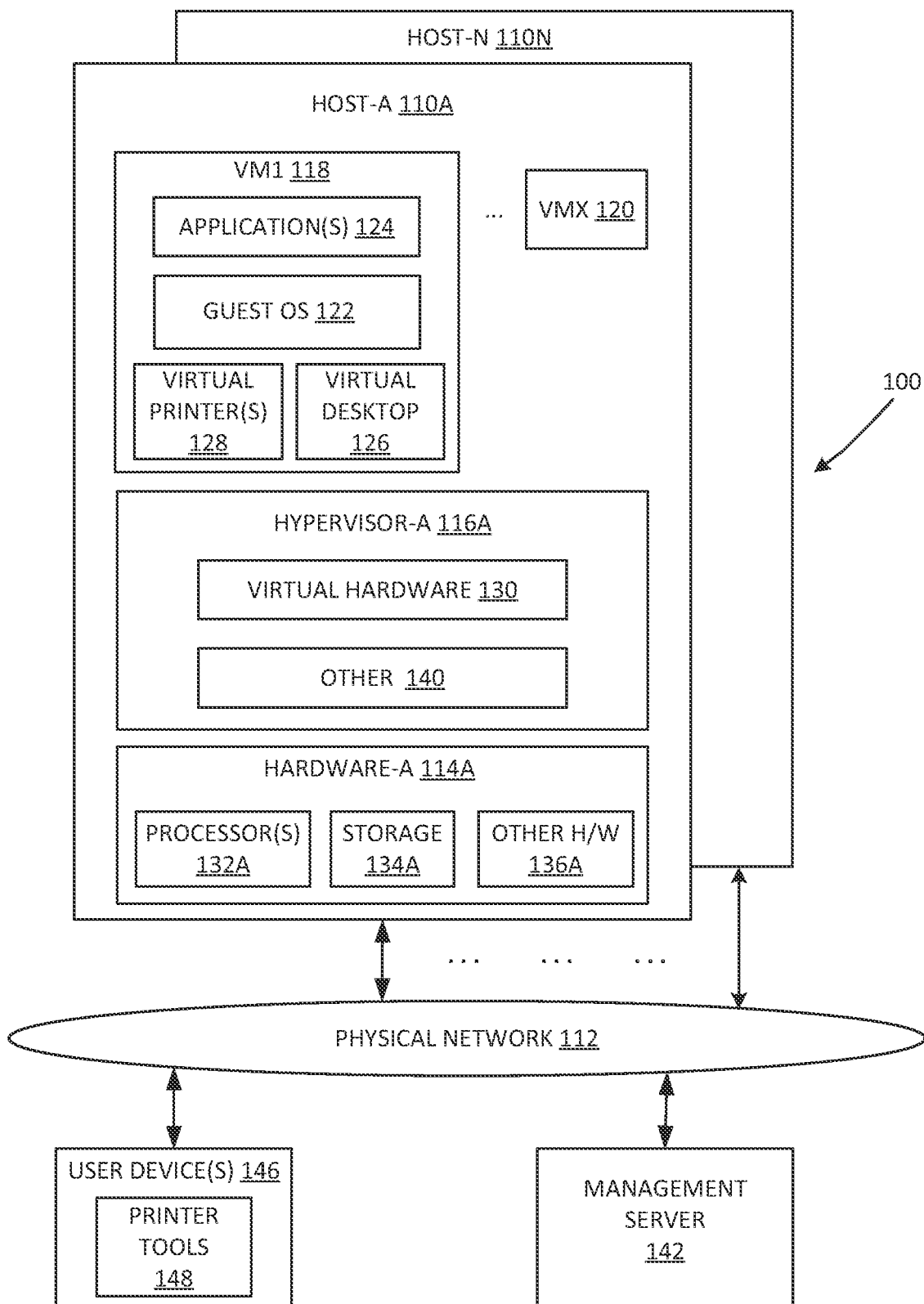
FIG. 1 is a schematic diagram illustrating an example virtualized computing environment that can implement a VDI with printing capability.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses challenges that are encountered when attempting to perform printing to a portable document format (PDF) or to some other document type or document format in a virtualized computing environment that supports a virtual desktop infrastructure (VDI). The methods/devices/systems described herein support per-user session PDF printing in a more efficient and effective manner compared to current techniques that attempt to print to PDF.

As an example, a print to PDF function is provided by a printer driver of Microsoft Windows. The print to PDF function enables a file (e.g., a document) to be created as a PDF file. In a VDI environment, it is possible for a user to access and use a virtual desktop (and virtual printers) via a mobile device or other type of user device, such as via the use of a browser on the mobile device. With the support of the browser, the user may operate the mobile device so as to access the virtual printer(s) to perform mobile printing, such as hypertext markup language (HTML)-access printing.

In current printing methods in a VDI environment, a virtual printer at a host is typically instantiated for each corresponding local printer (e.g., a physical printer) coupled to the user device (e.g., client device) and reflects/has the same printing-related properties (e.g., printer capabilities) as the corresponding local printer. However, when performing a print to PDF, only a single unique PDF printer (e.g., a virtual printer, such as an HTML printer) is instantiated at the host, regardless of how many local printers are present and connected to the user device. That is, all of the local printers are mapped to the same single PDF printer at the host, and the PDF printer does not reflect/have the varying printing-related properties of the multiple local printers. For example, the different local printers may support different paper sizes, but the PDF printer ignores these printing-related properties and instead supports its own properties (such as paper size, etc.).

When performing printing at/from the host in the scenario above, a PDF file is created first, and then the PDF file is transmitted from the host to the user device, for example as a PDF stream. When the user device receives the PDF stream, the user device may present a user interface (UI) to the user, such as a pop-up window, that prompts the user to select one of the multiple local printers to print the PDF file, select printer settings, etc.

The current printing method(s) described above has/have a number of drawbacks. A first drawback is that the user has to issue multiple printing commands. For example, if the user has A, B, and C local printers connected to the user device that are mapped to the single PDF printer at the host, the user has to issue a first printing command during the remote desktop session to select the PDF printer to create the PDF file, which is then sent from the host to the user device. When the user device receives the PDF file and as described above, the user then has to issue a second printing command to select the local printer to perform the printing, and then has to click a print button (or take some other action via the UI, such as via the popup window) to continue and complete the printing at the local printer.

A second drawback is that the PDF printer is a virtual printer that is unable to reflect the printing-related properties (e.g., printer capabilities) of one or more of the local printers that are connected to the user device. As previously explained above, all of the local printers connected to the user device are mapped to the same single PDF printer at host, and the PDF printer uses its own printing-related properties. This inconsistency may result in the generated PDF file having an incompatible printing format for the local printer(s), and so is unable to be printed or is printed incorrectly at the local printer(s).

The embodiments disclosed herein address the above and other drawbacks in several ways. As an example, some embodiments create a virtual printer (e.g., a PDF printer) at the host per local printer connected or otherwise communicatively coupled to the user device, such that each virtual printer is able to reflect or otherwise represent the specific printing-related properties of the corresponding local printer. A PDF file may be generated at the host using one of the PDF printers, and the PDF file may then be sent from the host to the corresponding local printer connected to the user device. In accordance with some embodiments, printing-related operations may then be performed at the corresponding local printer, without having to render popup windows to prompt the user to select the corresponding local printer to perform the printing.

For the sake of illustration and explanation, various embodiments will be described herein in the context of an operating system being Microsoft Windows of Microsoft Corporation, a browser being Chrome of Google LLC, a document type/format being PDF, etc. as examples. It is understood that these specific technologies are just example implementations, and other embodiments may be provided for other types of operating systems, browsers, document types/formats, etc.

Computing Environment

To further explain the details of techniques to perform printing of certain document types/formats (such as PDF printing as an example) in a virtual desktop infrastructure (VDI) or other type of virtual desktop environment, reference is first made herein to FIG. 1, which is a schematic diagram illustrating an example virtualized computing environment 100 that can implement VDI with printing capability. Depending on the desired implementation, virtualized computing environment 100 may include additional and/or alternative components than that shown in FIG. 1.

In the example in FIG. 1, the virtualized computing environment 100 includes multiple hosts, such as host-A 110A host-N 110N that may be inter-connected via a physical network 112, such as represented in FIG. 1 by interconnecting arrows between the physical network 112 and host-A 110A host-N 110N. Examples of the physical network 112 can include a wired network, a wireless network, the Internet, or other network types and also combinations of different networks and network types. For simplicity of explanation, the various components and features of the hosts will be described hereinafter in the context of the host-A 110A. Each of the other host-N 110N can include substantially similar elements and features.

The host-A 110A includes suitable hardware 114A and virtualization software (e.g., a hypervisor-A 116A) to support various virtual machines (VMs). For example, the host-A 110A supports VM1 118 . . . VMX 120, wherein X (as well as N) is an integer greater than or equal to 1. In practice, the virtualized computing environment 100 may include any number of hosts (also known as a computing devices, host computers, host devices, host servers, physical servers, server systems, physical machines, etc.), wherein each host may be supporting tens or hundreds of virtual machines. For the sake of simplicity, the details of only the single VM1 118 are shown and described herein.

According to various implementations, VM1 118 may include a service, module, engine, application, or other software/code (generally referred to herein as an agent or other analogous component) to enable VM1 118 to provide and support remote desktop functionality. Thus, VM1 118 may be an example of a VDI component that includes a guest operating system (OS) 122 and one or more guest applications 124 (and their corresponding processes) that run on top of the guest OS 122, for use by one or more remote desktops. The guest OS 122 may be Microsoft Windows or other type of OS, for example, and so VM1 118 running Windows may be referred to as a VDI component of a first type (e.g., a Windows-based agent). Using the guest OS 122 and/or other resources of VM1 118 and the host-A 110A, VM1 118 may generate a virtual desktop 126 (e.g., a remote desktop) that is operated by and accessible to one or more user device(s) 146 via the physical network 112. One or more virtual printers 128 may be instantiated in VM1 118 and/or elsewhere in the host-A 110A, including one or more PDF printers. VM1 118 may include other elements, such as code and related data (including data structures), engines, etc., which will not be explained herein in further detail, for the sake of brevity.

The user device 146 (e.g., a client device) may include printer tools 148 (explained in more detail in FIG. 2) to support print jobs at local printers that are locally connected or otherwise communicatively coupled to the user device 146. The user device 146 may be a desktop device and/or a mobile device having an operating system, a browser or other application, and various other components to establish and conduct a remote desktop session with the virtual desktop 126, including performing printing operations (e.g., PDF printing). According to various embodiments, the user device 146 may include a service, module, engine, application, or other software/code (generally referred to herein as a client or other analogous component) to enable the user device 146 to communicate with the agent at VM1 118 for purposes of conducting a remote desktop session with VM1

118 and/or to otherwise provide access to remote desktop functionality at VM1 118. For instance, a client in the form of or supported by an application (such as a browser or other type of client application) may be configured to establish and conduct a remote desktop session with the remote desktop 126. As an example in some embodiments, the client application may be Google Chrome or other type of browser/application based on a different operating system than that used by the agent, and so the client may be referred to as a VDI component of a second type (e.g., a Chrome-based client) that is different from the VDI component of the first type (e.g., the Windows-based agent). In some embodiments, both the agent and the client may be based on the same OS (e.g., both are Windows-based).

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs. The hypervisor-A 116A and/or other components of the host-A 110A (such as VMs themselves, including virtual desktops and virtual printers, guest OSs, etc.) may include other elements (shown generally at 140), including tools to support print jobs that are issued by VM1 118 to the virtual printers 128 and various other tools to provide resources for and to otherwise support the operation of the VMs. Such tools may include, for example, one or more print drivers or other printing-related components (such as a printer manager, print monitor, etc.) in some implementations.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the application(s) 124 (e.g., a word processing application, accounting software, a browser, etc.) in VM1 118. Corresponding to the hardware 114A, the virtual hardware 130 may include a virtual CPU, a virtual memory (including agent-side caches used for print jobs for the virtual printers 128), a virtual disk, a virtual network interface controller (VNIC), etc.

A management server 142 (usable by a system administrator, for example) of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster.

The management server 142 may be communicatively coupled to host-A 110A . . . host-N 110N (and hence communicatively coupled to the virtual machines, hypervisors, hardware, etc.) via the physical network 112. In some embodiments, the functionality of the management server 142 may be implemented in any of host-A 110A . . . host-N 110N, instead of being provided as a separate standalone device such as depicted in FIG. 1.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Figure 2:
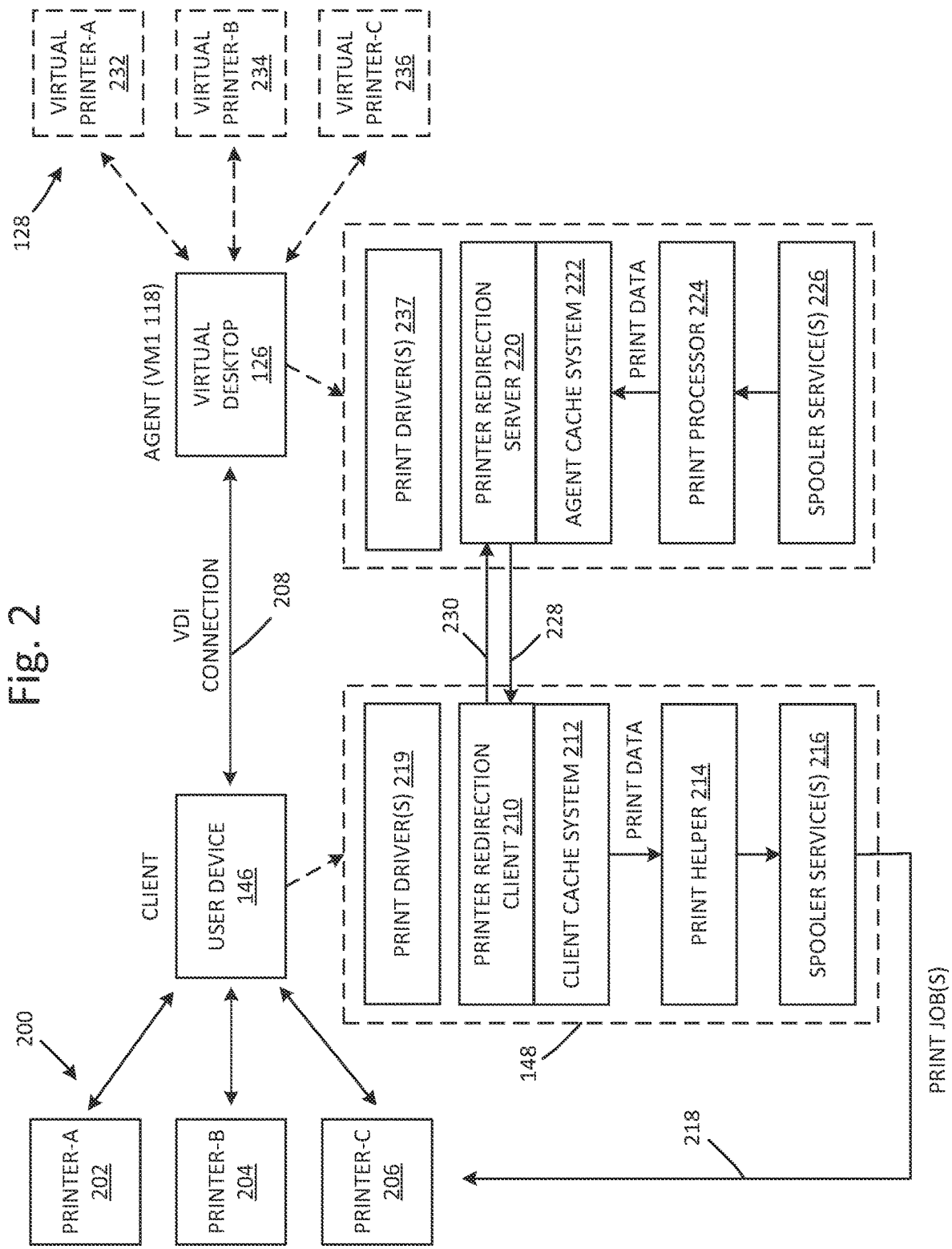
FIG. 2 is a diagram illustrating devices and printers for the virtualized computing environment of FIG. 1.

FIG. 2 is a diagram illustrating devices and printers for the virtualized computing environment 100 of FIG. 1. More specifically, FIG. 2 shows the client (e.g., at the user device 146), the agent (e.g., at the VM1 118 that provides the virtual desktop 126), and their associated elements and printers that execute print jobs.

The user device 146 is connected (via a network, universal serial bus (USB), or other wired/wireless connection) to a plurality of local printers 200, which may include one or more physical printers, one or more local PDF printers, etc. The local printers 200 include, for instance, a printer-A 202, a printer-B 204, and a printer-C 206. The user device 146 accesses, operates, or otherwise communicates with the virtual desktop 126 running on VM1 118 at a host (e.g., host-A 110A), via a VDI connection 208 or other type of communication channel(s) provided by the physical network 112.

As depicted in the example of FIG. 2, the user device 146 (and its connected local printers 200) are located at a first end (or first side) of the VDI connection 208, and components of the host (e.g., the virtual desktop 126 running on VM1 118 and its corresponding agent, the virtual printers 128, etc.) are located at a second end (or second side) of the VDI connection 208. As such, the first end/side of the VDI connection 208 (where the user device and the connected local printers 200 reside) may be generally referred to as a client side, and the second end/side of the VDI connection 208 (where the components of the host reside) may be generally referred to as an agent side.

The printer tools 148 of the user device 146 may include a printer redirection client 210 along with a client cache system 212 as a sub-component. The printer tools 148 may also include a print helper 214 and spooler service(s) 216 that operate in conjunction with the printer redirection client 210 and the client cache system 212 to prepare and send (shown at 218) print data for print jobs to the local printers 200, including a PDF file/stream/data for printing.

The printer tools 148 may further include one or more print drivers 219. For instance, there may be a corresponding print driver 219 for each printer-A 202, printer-B 204, and printer-C 206. For purposes of explanation, the print driver(s) 219 is shown in FIG. 2 as residing with the other elements 210-216 amongst the printer tools 148—the print driver(s) 219 may be installed in any suitable location (e.g., folder) in the user device 146, such as inside of an operating system of the user device 146, outside of the operating system, as a sub-component of elements 210-216, integrated along with an application, or other location.

Correspondingly installed at the agent side is a printer redirection server 220 along with an agent cache system 222 as a sub-component, a print processor 224, and spooler service(s) 226 that operate in conjunction with the printer redirection server 220 and the agent cache system 222 to prepare and send (shown at 228) print data to the printer redirection client 210 for printing at the printers 200. One or more of the printer redirection server 220, the agent cache system 222, the print processor 224, the spooler service(s) 226, and/or other printing-related components at the agent side can reside at VM1 118 or elsewhere in the host-A 110A.

When the VDI connection 208 is established between the client and the agent, information regarding the printers 200 (e.g., printing-related properties/capabilities that specify the features, functions, etc. of each of the printers 200 and/or of the documents supported by the each of the printers) may be sent (shown at 230) from the printer redirection client 210 to the printer redirection server 220 (and/or to some other component(s) at the agent side) via the VDI connection 208, which may support one or more virtual channels for communicating data (including the printing-related properties), files, streams, etc. between the client and the agent. This information is used by the printer redirection server 220 to instantiate the virtual printers 128. Thus, the virtual printers 128 include a virtual printer-A 232, a virtual printer-B 234, and a virtual printer-C 236 that respectively represent the physical printer-A 202, printer-B 204, and printer-C 206. In accordance with various embodiments, one or more of the virtual printers 128 may be a PDF printer that is instantiated/created so as to respectively represent/include the printing-related properties of the corresponding local printers 200.

The agent side may further include one or more print drivers 237. For instance, there may be a corresponding print driver 237 provided for each virtual printer-A 232, virtual printer-B 234, and virtual printer-C 236. The print driver(s) 237 may be installed in any suitable location (e.g., folder) in the VM1 118 or its host-A 110A, such as inside of the guest OS 122, outside of the guest OS 122, as a sub-component of elements 220-226 (such as part of the print processor 224), integrated along with an application (e.g., the application 124), inside/outside of the host OS, in the hypervisor-A 110, or other location.

One or more of the print driver(s) 237 may be a universal print driver (UPD). The UPD(s) may be configured to support one or more of: enhanced metafile (EMF) printing (e.g., an EMF print driver), extensible markup language (XML) paper specification (XPS) printing (e.g., an XPS print driver), a postscript (PS) printing (e.g., a PS driver), and so forth. According to various embodiments that will be described hereinafter, XPS print driver(s) may be adopted as the UPD(s) usable to cooperate with a virtual printer (e.g., a PDF printer operating in conjunction with a print to PDF driver) that is customized with the printing-related properties of a corresponding local printer 200.

In general operation, when the virtual desktop 126 issues a print job for one of the virtual printers (for instance, the virtual printer-C 236), the print processor 224 gets the print data from the spooler service(s) 226 and converts the print data to an appropriate format, and sends the print data to the agent cache system 222 so that the printer redirection server 220 can then transfer (at 228) the print data to the printer redirection client 210 at the client side. When the client cache system 212 receives the print data, the client cache system 212 sends the print data to the print helper 214. The print helper 214 will then write, via the spooler service(s) 216, the print data to the printer-C 206 for printing.

PDF Printing

Various embodiments will now be described as examples of printing to a certain document type/format, such as printing a document to a PDF file using a PDF printer. Depending on the type if operating system and/or browser that are being used at the client side and at the agent side, different PDF printing techniques may be used.

Figure 3:
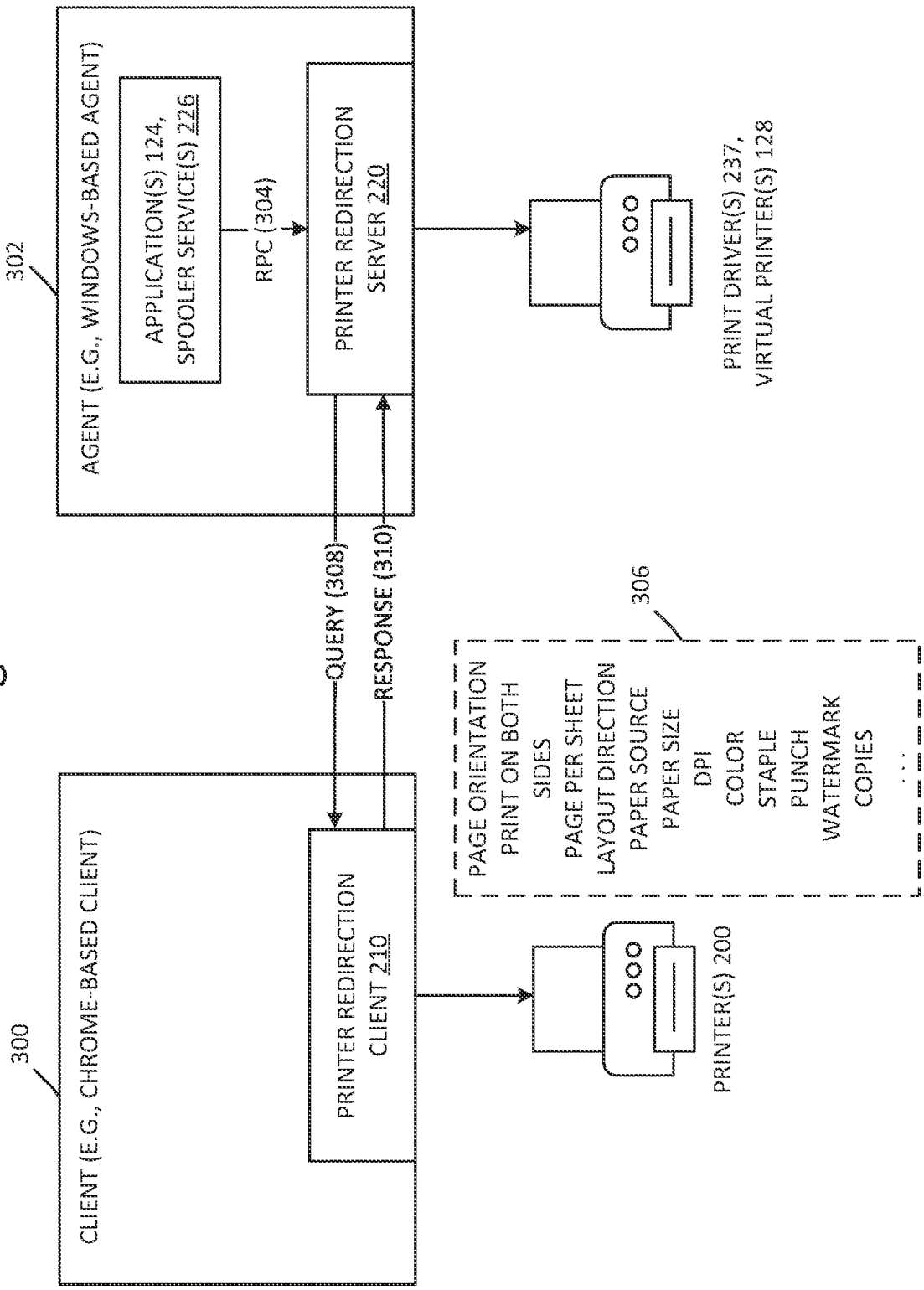
FIG. 3 is a diagram illustrating a first example of obtaining printing-related properties.

FIG. 3 is a diagram illustrating a first example of obtaining printing-related properties for printing (e.g., PDF printing). More specifically, FIG. 3 illustrates an example scenario in which a client side includes a client 300 that is a Windows-based client (e.g., has Microsoft Windows as an operating system), and further includes the printer redirection client 210 (and other printer tools 148) and local printers 200 such as described previously with respect to FIG. 2.

The agent side may include an agent 302 (e.g., a Windows-based agent), the application(s) 124, the virtual printer(s) 128, and printer tools such as the spooler service(s) 226, the printer redirection server 220, the print driver(s) 237, etc. such as described previously with respect to FIG. 2. In the example of FIG. 3, the print driver(s) 237 may include a XPS print driver that supports capability to convert a XPS file to a PDF file, and which is compatible for operation with the Windows-based client 300.

For PDF printing in FIG. 3, the application 124 and/or the spooler service 226 may generate and send a remote procedure call (RPC) 304 to the printer redirection server 220, so as to obtain the printing-related properties 306 of the local printer(s) 200 at the client side. The printer redirection server 220 then sends a query 308 (e.g., via a virtual channel) to the printer redirection client 210. The query 308 may include or be otherwise based on commands or calls such as GetDeviceCapabilities, GetGraphicsCapabilities, MakePTQuery (print ticket), GetDevMode, GetPrintCapabilities, etc. or analogous calls/commands/queries.

Since Windows is an operating system that has visibility into the printing-related properties 306, the RPC 304 can be executed locally by the printer redirection client 210 (and/or by some other client-side component), so as to generate and send a response 310 to the query 308. The response 310 includes at least some of the printing-related properties 306, such as listed/identified in FIG. 3 by way of example (e.g., page orientation, layout direction, color, watermark, etc.). From the perspective of the caller (e.g., the agent 302), the RPC 304, the query 308, and the response 310 has the appearance of happening/executing locally (at the agent side).

Having received the response 310, the agent 302 can then apply the printing-related properties 306 in connection with instantiating the virtual printer 128 with the printing-related properties 306, and operating the print driver 237 to convert XPS data to PDF data using the virtual printer 128). The PDF data (e.g., PDF file) can in turn be provided/transmitted to the client for printing via the printer(s) 200.

The example of FIG. 3 illustrates an embodiment in which the client 300 (e.g., a Windows client) has the capability to obtain the printer-related properties via execution of an application program interface (API) call (e.g., the RPC 304) from the agent 302, such as in the form of a Windows API call. However, for some other types of clients, such as a Google Chrome-based client on a mobile device that the user wishes to operate to perform mobile printing, the Chrome-based client has no knowledge of and/or is unable to respond to a Windows API call if the Windows API call is sent directly from the Windows-based agent to the Chrome-based client. Hence, the Chrome-based client does not have capability to obtain printing-related properties via the execution of a Windows API call such as GetDeviceCapabilities.

Therefore in situations that involve a Chrome-based client (or other type of client that does not use Windows API calls to obtain printing-related properties), various embodiments implement a print ticket technique in which the client obtains the printing-related properties and includes the printing-related properties in an extensible markup language (XML) stream, and the client sends the XML stream to the agent. Since the agent is a Windows-based agent in this example, the client is simulated (at the agent side) by a simulator that acts as a Windows-based client that provides the printing-related properties (contained in XML files), so as to be compatible with the Windows call stack at the agent.

Figure 4:
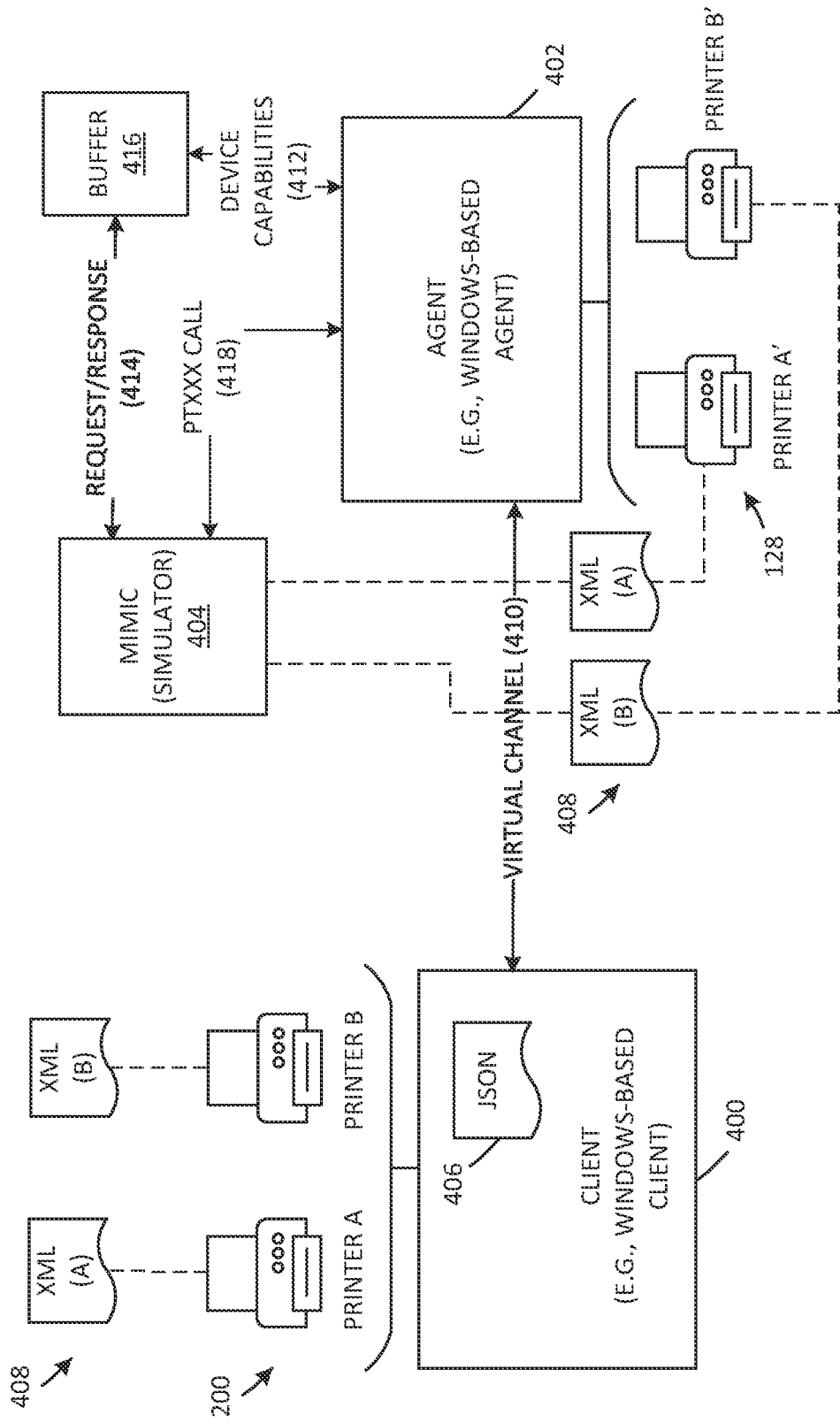
FIG. 4 is a diagram illustrating a second example of obtaining printing-related properties.

FIG. 4 illustrates this scenario involving a Chrome-based client (or other analogous type of client) in more detail.

More specifically, FIG. 4 is a diagram illustrating a second example of obtaining printing-related properties, in which a Chrome-based client 400 provides printing-related properties to a Windows-based agent 402 (e.g., the agent 302). The client 400 (which is of the second type, such as a Chrome-based client) is mimicked at the agent side by a simulator 404 or other analogous mimicking component that makes the client 400 appear as a Windows-based client to the agent 402, such as by the simulator 404 simulating the behavior/operations of the Windows-based client 300 of FIG. 3 or other VDI component of the first type.

At the client side, the local printers 200 may include a printer A and a printer B. The printing-related properties of the printers A and B may be contained/described in one or more javascript object notation (JSON) files 406 or other data structure(s) accessible by the client 400. For each of the printers A and B, its respective printing-related properties may be sent from the client 400 to the agent 402, via a virtual channel 410, as XML files 408 (e.g., an XML stream). For example and as shown in FIG. 4, the printing-related properties of the printer A are described in an XML file A, and the printing-related properties of the printer B are described in an XML file B.

According to various embodiments, the simulator 404 at the agent side receives the XML files 408 from the client 400 via the virtual channel 410. If the agent 402 issues a call, such as a DeviceCapabilities call 412 to determine paper properties such as paper size, etc. (e.g., DC_PAPERS, DC_PAPERSIZE, and DC_PAPERNAMES), the simulator 404 receives (a query at 414), and may parse the XML file(s) 408 and provide (a response at 414) having the requested paper properties (or other printing-related properties), in a format that is compatible with the query/response formats used by a Windows-based agent. In some embodiments, the simulator 404 and/or other component at the agent side can construct a buffer 414 (other type of cache or data structure) to store the printing-related properties, for current and future use by the agent 402 when configuring the virtual printers 128 for printing to PDF.

According to some embodiments, the agent 402 may issue a print ticket (PT) call 418, alternatively or in addition to the DeviceCapabilities call 412, to determine the printing-related properties. Examples of the PT call 418 may include PTGetPrintCapabilities, PTConvertPrintTicketToDevMode, PTConvertDevModeToPrintTicket, or other call formats/types in order to obtain the printing-related properties.

In the context of a PTGetPrintCapabilities call as an example, the simulator 404 receives the call 418, and may insert the specific printing-related properties of the printer(s) A/B into an XML template so as to provide the complete printing-related properties needed for configuring the corresponding virtual printer printers 128, which are shown in FIG. 4 as the virtual printers A' and B' that are configurable with the printing-related properties described in the respective XML files 408 (e.g., XML files A and B).

In the context of the call 418 being a PrintTicket to DevMode or DevMode to PrintTicket conversions, the agent 402 may use the print provider in the print driver (e.g., an XPS print driver at the agent side) to achieve conversion.

Having thus configured the virtual printers 128 (e.g., the virtual printers A' and B') with the printing-related properties of the corresponding local printers 200 (e.g., the local printers A and B), PDF printing may then be performed at the agent side when a print job is initiated from an application (e.g., the application 124 in FIG. 1). Since the Chrome-based client 400 only accepts PDF file formats, then the agent 402 has no other choice but to provide a PDF file to the client side. With the use of a universal XPS driver at the agent side (e.g., the print driver 237), the print driver 237 can generate a file in XPS format and send a corresponding XPS data stream to a print monitor component for cooperation with the configured virtual printer 128 to convert the XPS file to a PDF file. Then, the PDF file can be sent from the agent side to the client 300 for printing at the appropriate local printer 200.

Figure 5:
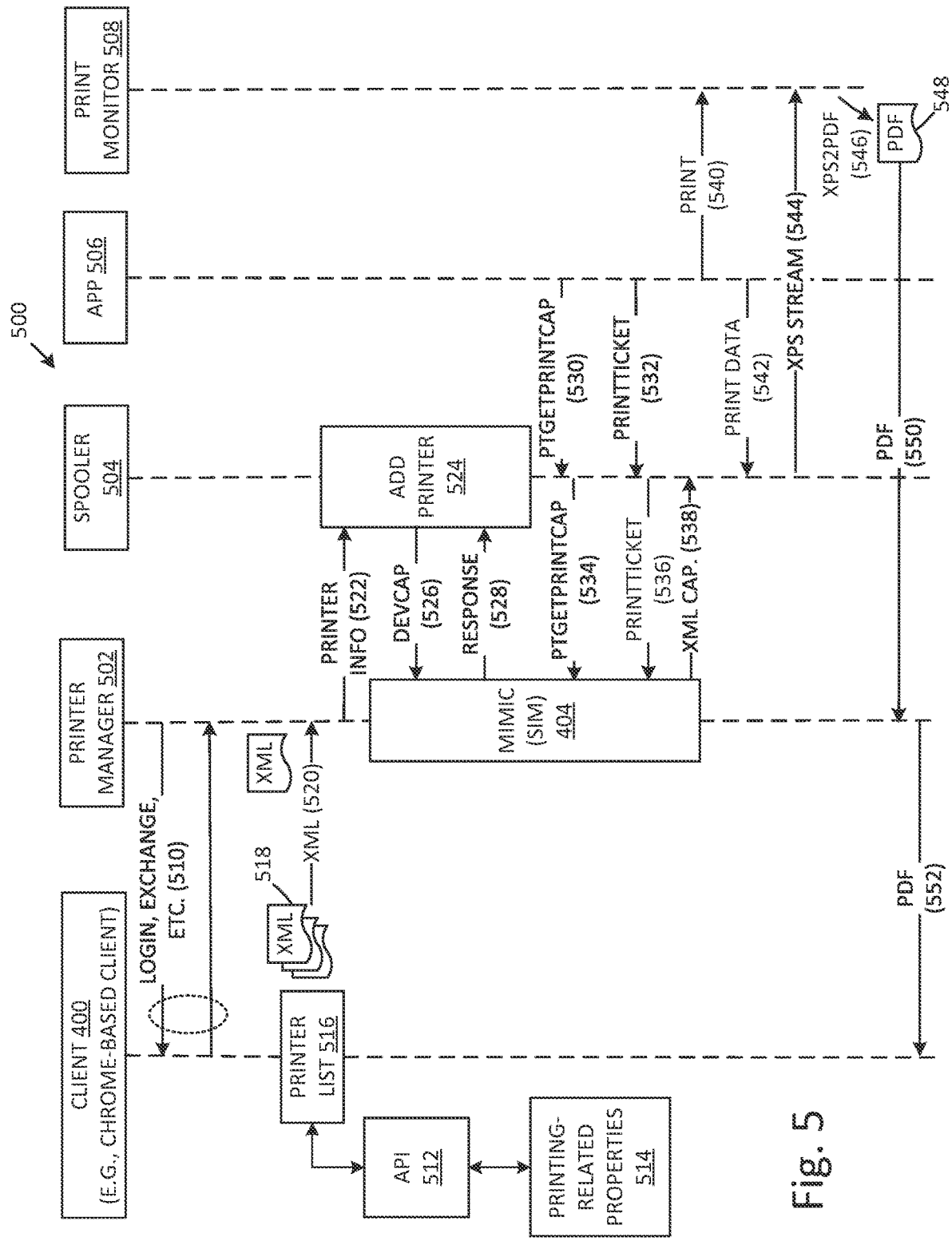
FIG. 5 is a flow diagram illustrating an example to provide printing-related properties from a user device to a host and to perform PDF printing.

The operations described above with respect to FIG. 4 are shown in further detail in FIG. 5. More particularly, FIG. 5 is a flow diagram 500 illustrating an example to provide printing-related properties from the client 400 (e.g., a Chrome-based client) to the agent 402 (e.g., a Windows-based agent) and to perform PDF printing. Components of the agent 402 and/or other components at the agent side (including the virtual printer 128, the print driver 237, and related components) are represented in FIG. 5 by a printer manager 502, a spooler 504 (e.g., the spooler services 226 in FIG. 2), an application 506 (e.g., one of the applications 124 in FIG. 1), and a print monitor 508. FIG. 5 further shows the simulator 404 at the agent side to mimic the client 400.

At 510, the client 400 logs into a remote desktop session with the agent 402. When the virtual channel 410 is established and ready, the client 400 and the printer manager 502 may exchange version information, platform information, etc. At 510, the agent 402 may also request other information about the client 400, including the printer manager 502 requesting a list of the local printers 200 and their printing-related properties.

In response to this request, the client 400 generates an API call 512 to obtain the printing-related properties 514 of the local printer(s) 200. The client 400 in turn generates a printer list 516 of the local printer(s) and one or more XML files 518 for the printer list 516. For example, for each of the local printers 200, a single XML file 518 may be generated by the client 400 that describes the respective local printer's printing-related properties (e.g., printer capabilities), and the XML files 518 are then sent at 520 by the client 400 to the agent side.

The printer manager 502 may then generate and send printer information 522 to the spooler 504, so as to enable the spooler 524 to add/instantiate a virtual printer 128 (e.g., an XPS printer) corresponding to each local printer 200 contained in the printer list 516. The XML files 518 may be received by the simulator 404 from the client 400, such as explained previously above with respect to FIG. 4. Consequently, when a device capabilities call 526 (e.g., the DeviceCapabilities call 412 of FIG. 4) is made during the course of adding a printer (at 524), an appropriate response 528 can be generated and sent to the caller by the simulator 404, with the response 528 containing the requested device/printer capabilities information and/or other printing-related properties, for use in configuring the newly added virtual printer.

When printing to a specific/particular virtual printer 128, the application 506 may query the spooler 504 for print capabilities (e.g., a PTGetPrintCapabilities call 530) or print a ticket (e.g., a PrintTicket call 532). The application 506 may check a cache or other storage location (e.g., the buffer 416 of FIG. 4) first, and if there is no cache hit, then the simulator 404 is queried (e.g., via a PTGetPrintCapabilities call 534 and/or a PrintTicket call 536). The simulator 404 responds with the requested printing-related properties at 538, such as with printer capabilities information described in an XML file, so as to enable the configuration of the particular virtual printer 128 with the printing-related properties.

At 540, a print job (e.g., to print to PDF) is initiated by the application 506 with the print monitor 508. The application 506 sends print data, such as a document and/or its contents to be printed, to the spooler at 542. The spooler 542 generates a corresponding XPS stream 544 that is sent to the print monitor 508. An XPS to PDF conversion is performed (e.g., by the XPS print driver) at 546, so as to generate a PDF file 548 (e.g., a file of a first format or format type). If there is extra information about printing (e.g., number of copies, paper size, page orientation, etc.) from the XPS stream 544, such additional information may be bounded to the PDF file 548. In some embodiments, the XPS print driver coexists with a print to PDF driver, both at the agent side, such that the XPS print driver can perform conversion from an XPS file (e.g., a file of a second format or format type) to a PDF file (e.g., a file of a first format different from the second format), and then the print to PDF driver can perform printing of the PDF file to the virtual printer 128 (e.g., a PDF printer).

The PDF file 548 (e.g., a PDF stream 550) is sent from the print monitor 508 to the printer manager 502, which then sends (at 552) the PDF stream to the client 400. As the client 400 in this example is a Chrome-based client, the client 400 can use the corresponding local printer 200 to print the PDF file 548.

The printing at the client side may be performed without additional popup windows that require interaction with the user. For example, since the printing-related properties of the specific local printer 200 has already been previously sent to the agent 402 and used to configure the corresponding/particular virtual printer 128, the PDF file 548 is already in a format that is compatible/consistent with that local printer 200, and the PDF stream sent to the client 400 also carries/integrates the printer settings, etc. that would otherwise have been provided by the user via interaction with a popup window. Thus, when the client 400 receives the PDF file 548 and/or related printing instructions, the client 400 knows which local printer 200 to use to perform the printing and knows the printing formats/settings, and the PDF file 548 will be printed by that local printer 200 based on the printing-related properties of that local printer 200. According to some embodiments, the client 400 may call one or more APIs to cooperate with the local printer 200 to perform the printing in a seamless/transparent manner, with little or no user interaction with popup windows being needed.

In some embodiments, the PDF file 548 may be physically printed to a paper form. It is also possible to save/print the PDF file in electronic format at the client side, while still preserving printing-related properties for the PDF file, such as paper size, etc.

In some embodiments of the process depicted by the flow diagram 500 of FIG. 5, the agent 402 may notify the client 400 of various progress status during the course of performing printing. Such progress status reported by the agent 402 to the client 400 may include but not be limited to: the start of generation of the XPS stream to be converted to a PDF file, the completion of the generation of the XPS stream, the start of generation of the PDF file, the completion of the generation of the PDF file and the start of the transmission of the PDF file to the client 400, the completion of the transmission of the PDF file to the client 400, etc. Any error messages can also be passed from the agent 402 to the client 400.

According to some embodiments, a kill switch feature may also be provided. With the kill switch feature, an HTML printer may be disabled. For example, the kill switch may be used to disable the capability to use the virtual printers 128 for PDF printing and/or other type of printing.

Figure 6:
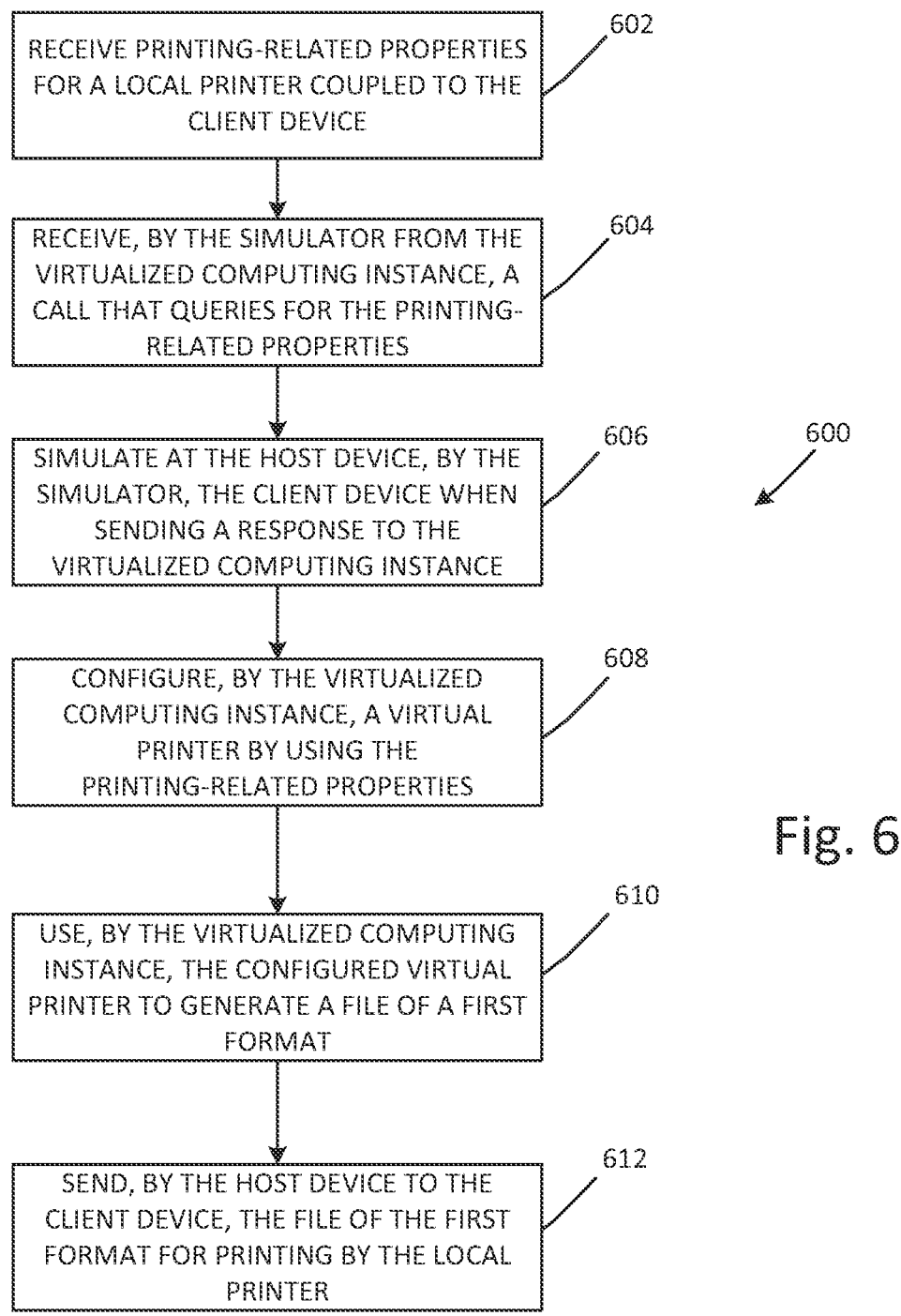
FIG. 6 is a flowchart of an example method to perform printing in the virtualized computing environment of FIG. 1.

FIG. 6 is a flowchart of an example method 600 to perform printing in the virtualized computing environment of 100 of FIG. 1. The example method 600 may include one or more operations, functions, or actions illustrated by one or more blocks, such as blocks 602 to 612. The various blocks of the method 600 and/or of any other process(es) described herein may be combined into fewer blocks, divided into additional blocks, supplemented with further blocks, and/or eliminated based upon the desired implementation. In one embodiment, the operations of the method 600 and/or of any other process(es) described herein may be performed in a pipelined sequential manner. In other embodiments, some operations may be performed out-of-order, in parallel, etc.

According to one embodiment, the method 600 may be performed by the components of a host shown in FIGS. 1-5, in cooperation with the user device 146 and its components shown in FIGS. 1-5. In other embodiments, various other elements in a computing environment may perform, individually or cooperatively, the various operations of the method 600.

At a block 602 ("RECEIVE PRINTING-RELATED PROPERTIES FOR A LOCAL PRINTER COUPLED TO THE CLIENT DEVICE"), the host receives printing-related properties from the client 400, such as via XML files 518 that describe/provide the printing-related properties of the local printer(s) 200 coupled to the user device 146 having the client 400. The XML files 518 may provide the printer list 516, printer capabilities, document settings, etc. associated with each of the local printers 200.

According to various embodiments, the printing-related properties may be received by the simulator 404 from the client 400. The simulator 400 is able to recognize and respond to Windows API calls from the agent 402 for the printing-related properties, whereas the client 400 is unable to recognize/respond to such API calls. Hence, the simulator 400 may be configured to simulate the client 400, by mimicking a Windows-based client that is able to respond to the API calls from the agent 402 at VM1 118 that provides the virtual desktop 126.

The block 602 may be followed by a block 604 ("RECEIVE, BY THE SIMULATOR FROM THE VIRTUALIZED COMPUTING INSTANCE, A CALL THAT QUERIES FOR THE PRINTING-RELATED PROPERTIES"), wherein the agent 402 generates and sends a query for the printing-related properties. The query may be a Windows API call that requests device capabilities, a print ticket call to request the printing-related properties, etc. The query/call may be received by the simulator 404 at the block 604, instead of the query/call being sent directly to the client 400. Further in this manner, repeated requests and responses for printing-related properties, sent via the virtual channel (e.g., a communication channel such as the VDI connection 208), can be avoided or reduced.

The block 604 may be followed by a block 606 ("SIMULATE AT THE HOST DEVICE, BY THE SIMULATOR, THE CLIENT DEVICE WHEN SENDING A RESPONSE TO THE QUERY TO THE VIRTUALIZED COMPUTING INSTANCE"), wherein the simulator 404 simulates the client 400, by mimicking a Windows-based component/device that is able to respond to the API calls from the agent.

The simulator 404 generates a response that provides the printing-related properties being requested by the agent 402.

The block 606 may be followed by a block 608 ("CONFIGURE, BY THE VIRTUALIZED COMPUTING INSTANCE, A VIRTUAL PRINTER BY USING THE PRINTING-RELATED PROPERTIES"), wherein the agent 402 configures a virtual printer at the agent side that includes/integrates the printing-related properties provided by the response from the simulator 402. As described above, the operations at the block 608 may include instantiating/adding a printer having the printing-related properties, further configuring the newly added printer with any additional printing-properties when a print ticket call is made, etc.

The block 608 may be followed by a block 610 ("USE, BY THE VIRTUALIZED COMPUTING INSTANCE, THE CONFIGURED VIRTUAL PRINTER TO GENERATE A FILE OF A FIRST FORMAT"), wherein the agent 402 (via the use of an XPS print driver and/or other print drivers) processes a print job from an application, by generating an XPS stream (which includes the print data to be printed and which further includes/reflects at least some of the printing-related properties), and then converting the XPS stream to a PDF stream/file.

The block 610 may be followed by a block 612 ("SEND, BY THE HOST DEVICE TO THE CLIENT DEVICE, THE FILE OF THE FIRST FORMAT FOR PRINTING BY THE LOCAL PRINTER"), wherein the agent 402 sends the generated PDF file as a PDF stream to the client 400, for printing by the corresponding local printer 200 at the client side.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1-6. For example, computing devices capable of acting as agent-side devices/components or client-side user devices/components may be deployed in or otherwise operate in conjunction with the virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances (VCIs) may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to improve the capability and efficiency in printing certain document types/format, such as printing to PDF or other document type/format.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

The invention claimed is:

1. A method to perform printing in a virtualized computing environment that includes a host device configured to communicate with a client device, the method comprising:
 receiving, by the host device from the client device via a communication channel, printing-related properties for a local printer coupled to the client device,
  wherein the host device supports a virtualized computing instance that provides a virtual desktop,
  wherein the printing-related properties information is received from the client device by a simulator at the host device;

receiving, by the simulator from the virtualized computing instance, a call that queries for the printing-related properties;

simulating at the host device, by the simulator, the client device when sending a response to the virtualized computing instance, wherein the response provides the printing-related properties, and wherein simulating the client device enables the call to be executed at the host device to generate the response;

configuring, by the virtualized computing instance, a virtual printer for the virtual desktop by using the printing-related properties provided by the response; and using, by the virtualized computing instance, the configured virtual printer to generate a file of a first format.

2. The method of claim 1, further comprising sending, by the host device to the client device, the file of the first format for printing by the local printer.

3. The method of claim 1, wherein using the configured virtual printer to generate the file of the first format comprises:

using a print driver to generate a stream of a second format different from the first format, wherein the stream includes print data for printing in the file of the first format and further includes at least some of the printing-related properties;

converting the stream of the second format to a stream corresponding to the file of the first format; and binding, to the file of the first format, the at least some of the printing-related properties.

4. The method of claim 3, wherein the file of the first format is a portable document format (PDF) file, and wherein the stream of the second format is an extensible markup language paper specification (XPS) stream.

5. The method of claim 1, wherein receiving the printing-related properties for the local printer comprises receiving, by the simulator, one or more extensible markup language (XML) files that describe the printing-related properties.

6. The method of claim 1, wherein the virtualized computing instance and the client device simulated at the host device are based on a first operating system, and wherein the client device includes a browser that is based on a second operating system different from the first operating system.

7. The method of claim 1, wherein:

the call that queries for the printing-related properties is an application program interface (API) call, the client device is unable to respond to the API call with the printing-related properties, if the API call is sent by the virtualized computing instance directly to the client device, and the client device is simulated at the host device, by the simulator, by being mimicked as a component that is capable to respond to the API call with the response that provides the printing-related properties.

8. A non-transitory computer-readable medium having instructions stored thereon, which in response to execution by one or more processors, cause the one or more processors to perform a method to print in a virtualized computing environment that includes a host device configured to communicate with a client device, wherein the method comprises:

receiving, by the host device from the client device via a communication channel, printing-related properties for a local printer coupled to the client device, wherein the host device supports a virtualized computing instance that provides a virtual desktop, wherein the printing-related properties information is received from the client device by a simulator at the host device;

receiving, by the simulator from the virtualized computing instance, a call that queries for the printing-related properties;

simulating at the host device, by the simulator, the client device when sending a response to the virtualized computing instance, wherein the response provides the printing-related properties, and wherein simulating the client device enables the call to be executed at the host device to generate the response;

configuring, by the virtualized computing instance, a virtual printer for the virtual desktop by using the printing-related properties provided by the response; and using, by the virtualized computing instance, the configured virtual printer to generate a file of a first format.

9. The non-transitory computer-readable medium of claim 8, wherein the method further comprises:

sending, by the host device to the client device, the file of the first format for printing by the local printer.

10. The non-transitory computer-readable medium of claim 8, wherein using the configured virtual printer to generate the file of the first format comprises:

using a print driver to generate a stream of a second format different from the first format, wherein the stream includes print data for printing in the file of the first format and further includes at least some of the printing-related properties;

converting the stream of the second format to a stream corresponding to the file of the first format; and binding, to the file of the first format, the at least some of the printing-related properties.

11. The non-transitory computer-readable medium of claim 10, wherein the file of the first format is a portable document format (PDF) file, and wherein the stream of the second format is an extensible markup language paper specification (XPS) stream.

12. The non-transitory computer-readable medium of claim 8, wherein receiving the printing-related properties for the local printer comprises receiving, by the simulator, one or more extensible markup language (XML) files that describe the printing-related properties.

13. The non-transitory computer-readable medium of claim 8, wherein the virtualized computing instance and the client device simulated at the host device are based on a first operating system, and wherein the client device includes a browser that is based on a second operating system different from the first operating system.

14. The non-transitory computer-readable medium of claim 8, wherein:

the call that queries for the printing-related properties is an application program interface (API) call, the client device is unable to respond to the API call with the printing-related properties, if the API call is sent by the virtualized computing instance directly to the client device, and the client device is simulated at the host device, by the simulator, by being mimicked as a component that is capable to respond to the API call with the response that provides the printing-related properties.

15. A host device in a virtualized computing environment that is configurable to communicate with a client device, the host device comprising:

one or more processors; and a non-transitory computer-readable medium having instructions stored thereon, which in response to execution by the one or more processors, cause the one or more processors to perform operations to print in the virtualized computing environment, wherein the operations comprise:

receive, by the host device from the client device via a communication channel, printing-related properties for a local printer coupled to the client device, wherein the host device supports a virtualized computing instance that provides a virtual desktop, wherein the printing-related properties information is received from the client device by a simulator at the host device;

receive, by the simulator from the virtualized computing instance, a call that queries for the printing-related properties;

simulate at the host device, by the simulator, the client device when sending a response to the virtualized computing instance, wherein the response provides the printing-related properties, and wherein simulation of the client device enables the call to be executed at the host device to generate the response;

configure, by the virtualized computing instance, a virtual printer for the virtual desktop by using the printing-related properties provided by the response; and use, by the virtualized computing instance, the configured virtual printer to generate a file of a first format.

16. The host device of claim 15, wherein the operations further comprise:
send, by the host device to the client device, the file of the first format for printing by the local printer.

17. The host device of claim 15, wherein the operations to use the configured virtual printer to generate the file of the first format comprise operations to:

use a print driver to generate a stream of a second format different from the first format, wherein the stream includes print data for printing in the file of the first format and further includes at least some of the printing-related properties;

convert the stream of the second format to a stream corresponding to the file of the first format; and bind, to the file of the first format, the at least some of the printing-related properties.

18. The host device of claim 17, wherein the file of the first format is a portable document format (PDF) file, and wherein the stream of the second format is an extensible markup language paper specification (XPS) stream.

19. The host device of claim 15, wherein the operations to receive the printing-related properties for the local printer comprise operations to:

receive, by the simulator, one or more extensible markup language (XML) files that describe the printing-related properties.

20. The host device of claim 15, wherein the virtualized computing instance and the client device simulated at the host device are based on a first operating system, and wherein the client device includes a browser that is based on a second operating system different from the first operating system.

21. The host device of claim 15, wherein:
the call that queries for the printing-related properties is an application program interface (API) call,
the client device is unable to respond to the API call with the printing-related properties, if the API call is sent by the virtualized computing instance directly to the client device, and
the client device is simulated at the host device, by the simulator, by being mimicked as a component that is capable to respond to the API call with the response that provides the printing-related properties.

* * * * *